April 9, 1929.  F. C. LIKAS  1,707,987
LIQUID APPLICATOR FOR VEHICLE BRAKES
Filed Oct. 9, 1926  2 Sheets-Sheet 2
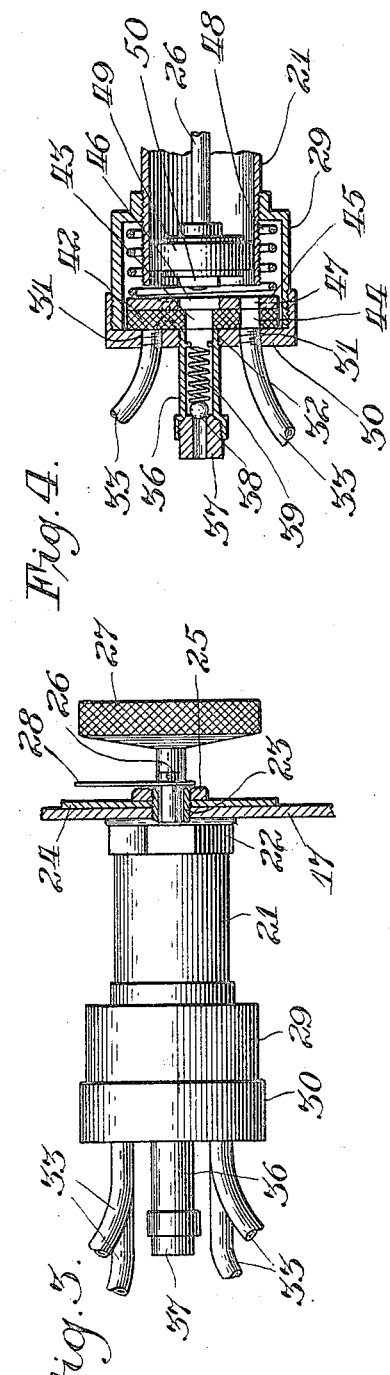
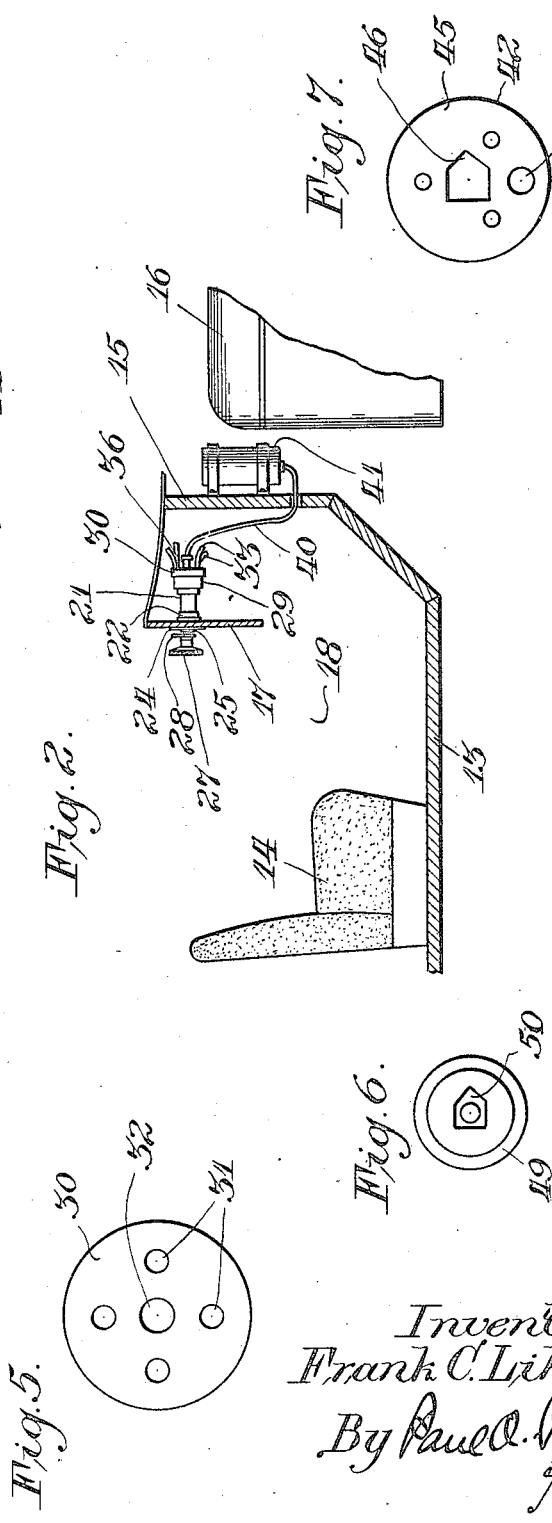
Inventor:
Frank C. Likas,
By Paul O. Pippel
Atty.

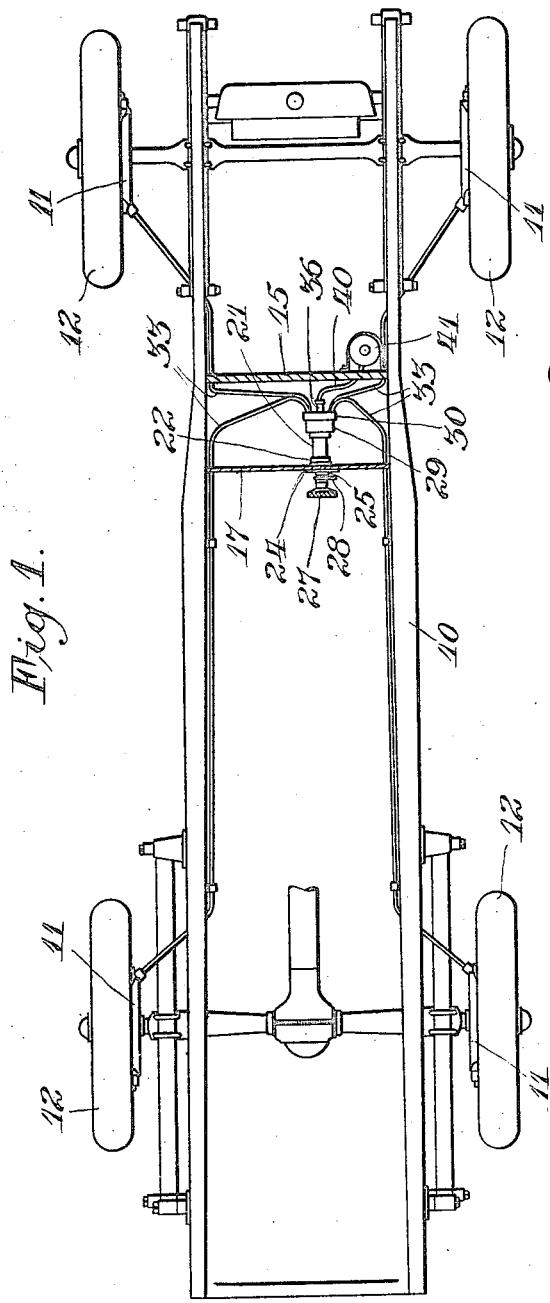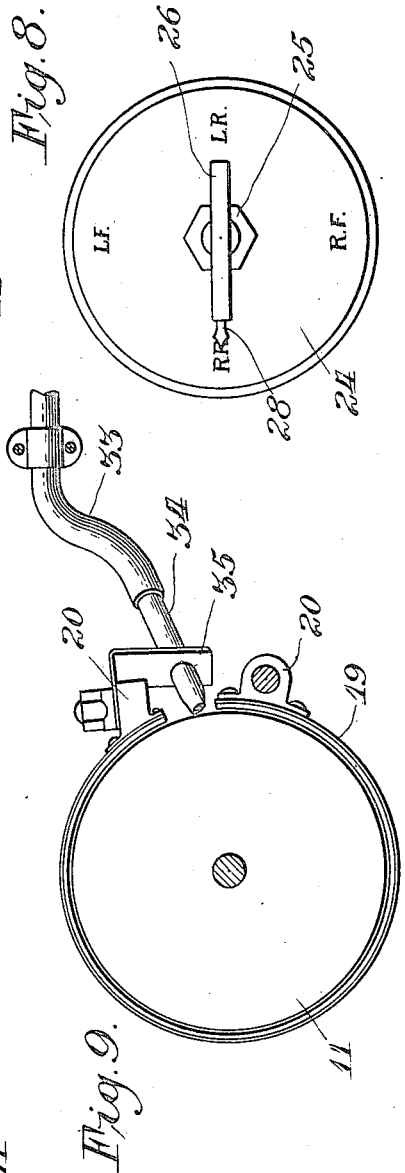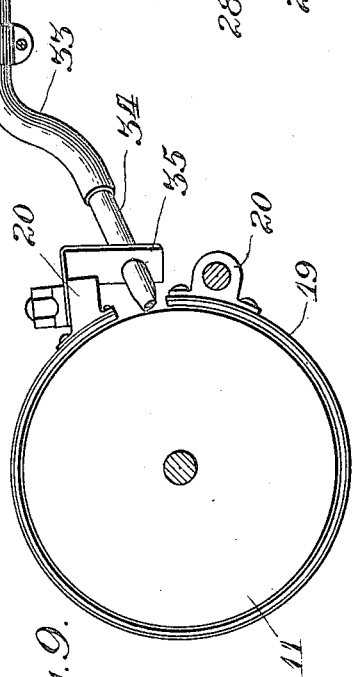

Patented Apr. 9, 1929.

1,707,987

UNITED STATES PATENT OFFICE.

FRANK C. LIKAS, OF CHICAGO, ILLINOIS.

LIQUID APPLICATOR FOR VEHICLE BRAKES.

Application filed October 9, 1926. Serial No. 140,563.

In the operation of automobiles under present day crowded traffic conditions, such as prevail in the larger cities, the necessity for employment of the brakes is very frequent. Such frequent use quickly smoothens or glazes the surface of the brake bands and further use of an automobile under such circumstances is dangerous, as the brakes cannot satisfactorily hold the vehicle. These bands may, of course, be replaced, but this is expensive. Replacement of brake bands may be definitely postponed for a considerable time by the employment of a resinous liquid mixture applied to the brake band surface when glazing thereof occurs, such liquid overcoming the glaze and permitting the brakes to function properly. Such liquid is sold at present and commercially put out in containers resembling the well known oil can. In the case of spoke wheels the brakes are fairly accessible and there exists no great trouble in applying this liquid to the brake bands. However, in the case of closed or disk wheels, difficulty is encountered, for it requires one to get under the automobile to reach the brake bands.

This invention relates to a mechanical applicator for such brake liquid, which will make it a relatively simple matter to overcome brake band glazing.

The primary object of this invention is to provide a device located in the cab of the vehicle which will permit the operator to apply such liquid to the brake bands without dirtying his hands or clothes, and with a minimum of effort.

Another object is to provide an improved applicator for forcing this brake liquid to the brake bands.

Still another object is to provide such a device which will permit optional selection of any brake to which such liquid may be forced.

Other objects will be apparent to those skilled in this art as the description progresses.

These very desirable objects are accomplished in the provision of an improved applicator located on the instrument panel of an automobile, said applicator resembling a pump which is in communication with a reservoir located on the engine side of the vehicle dash, for supplying this brake liquid to the applicator. Leads extend from the applicator to each brake and by means of an indicator, an operator may select any brake and force the liquid to its band, as will be later understood.

In the accompanying sheets of drawings an illustrative embodiment of the invention has been shown. In these drawings,—

Figure 1 is a plan view of a vehicle having brakes and showing the improved applicator in position thereon, with its connections to the respective brakes;

Figure 2 is a fragmentary side elevation of a vehicle, illustrating a cab and the relative location of parts with respect thereto;

Figure 3 is a side elevational view, partly in section, of the applicator;

Figure 4 is a sectional detail view of the head end of the applicator, showing the valve structure therein;

Figure 5 is a face detail view of the head piece of the applicator;

Figure 6 is a detail face view of the piston head;

Figure 7 is a face detail view of the valve;

Figure 8 is a face detail view of the telltale, or indicator; and

Figure 9 is a detail elevational view of one of the brakes, showing how the conduits from the applicator are associated therewith.

The drawings show a standard motor vehicle 10 having a brake drum 11, associated with each wheel 12. The vehicle also embodies a floor 13, seat 14, dash 15, engine 16, and instrument panel 17, which elements delineate the usual cab space 18. Each brake drum 11 is provided with the usual brake band 19 conventionally operable by the spaced members 20 to which the bands are fastened.

After frequent application of these bands to the drums for the purpose of stopping the vehicle, it is found that the bands' braking surfaces become glazed and smoothened to such an extent that they no longer will hold the vehicle when the bands are applied to the drums. This objectionable glazing can be overcome by an application to the bands, of a brake liquid now being generally sold for this purpose. The main object of this invention, it will be recalled, was to provide a means for applying this liquid to the brake bands with a minimum of physical effort.

Accordingly, a novel applicator in the form of a pump, or gun, has been provided, which is located in the cab of the vehicle, and preferably on the instrument panel, where it is readily accessible to the driver of the vehicle.

This applicator comprises a body in the shape of a barrel or cylinder 21, having a cap 22 threaded on one end, which cap may be formed with an integral threaded hollow extension 23. This extension may be threadedly fitted through the instrument panel 17 (see Figure 3). Fitted over the face of the panel on the extension is a dial plate 24 for a purpose later to appear, and the assembly is made fast by a nut 25 threaded over the free end of the extension, as shown.

Projected centrally, and slidably, through the cap 22 and its hollow extension, is a plunger 26 carrying at its free end in the cab space, a knurled knob 27. A telltale or pointer 28 is made fast to the plunger adjacent the dial 24, as shown. It can be seen that the greater part, and particularly the body, of the applicator is hidden behind the instrument panel.

Looking at Figure 4, it can be seen that the head end of the cylinder is externally threaded to receive an enlarged cylindrical fitting 29, which in turn is closed by a cap 30 threaded thereto. It is to be noted than an annular space is thus formed between the cylinder end and fitting 29. The cap 30 (see Figure 5) is formed with four equi-distantly spaced openings 31, and a central opening 32. Fitted into the openings 31 are conduits 33 which respectively lead to each brake (see Figure 1). Preferably, these conduits are flexible to a point adjacent each brake where they communicate with a rigid pipe 34 carried in a bracket 35, as shown, the pipe 34 being in a position to discharge directly onto the brake bands, as shown in Figure 9.

The opening 32 has fitted therein a nipple 36, carrying a hollow nut 37 and ball 38, pressed by a spring 39, to form a ball check valve. This nut 37 is in communication with a lead 40 to a reservoir 41, preferably carried on the dash 15 outside of the cab space 18.

Abutting the cap 30 inside the applicator is a packing washer 42 having a central opening 43 and one off-center opening 44. Fastened to this washer is a valve disk 45, (see Figure 7), provided with a polygonally shaped key opening 46 and one off-center opening 47. A coil spring 48 constantly exerts a force to press the disk and washer against the cap 30.

The end of the plunger 26 carries a piston 49, and the piston carries an extension 50 of polygonal shape, which serves as a key to register in the opening 46, (see Figure 6).

The use and operation of this invention will now be described. First the reservoir 41 will be filled with a supply of brake liquid. The driver in his seat, with the aid of the telltale and dial marked in abbreviations "left front," "left rear," "right front" and "right rear," can optionally select that brake which is not holding. Grasping the knob 27, the same is slightly turned until the key 50 registers in the opening 46 of the valve disk. The disk and piston may now be turned together until the openings 47 and 44 of the disk and packing 42 register with the proper conduit leading to the selected brake. The valve has now been set and a rearward pull on the piston, by means of the knob 27, will draw in a charge of liquid from the supply reservoir, the ball check 38 permitting this. A forward movement of the plunger will cause the piston to seat the ball check, and discharge the liquid through the valve disk 45 through the communicating conduit 33 to the selected brake. In practice the body of the applicator will be proportioned to discharge the proper amount of liquid, as will be understood. In this manner, any conduit and brake may be selected, as indicated by the telltale, to supply brake liquid to any selected brake.

From this detailed disclosure, it can now be seen that all of the desirable objects heretofore recited are achieved, and that the structure is simple and not costly. Also, the same is positive in operation and is not likely to get out of order.

Of course, it must be understood that only an illustrative embodiment of this invention has been shown and described, the same obviously being susceptible of changes and modifications. It is the intention to cover all such changes which do not depart from the spirit and scope of this invention, as indicated in the following claims.

What I claim as new is:

1. In a vehicle having brakes, a single brake liquid applicator for the bands of said brakes, said applicator comprising a barrel having conduits leading to each brake, a piston movable in the barrel, and an adjustable valve connectible with the piston to be adjusted thereby, whereby discharge of the liquid may be directed to any selected brake.

2. In a vehicle having brakes, a cab, conduits extending from each brake to the cab, a brake liquid applicator located in the cab for the bands of said brakes, said applicator comprising a barrel, a piston movable in the barrel, a valve in the barrel having a polygonally shaped opening, and a correspondingly shaped extension on the piston which may be fitted into said opening to turn said valve to permit discharge of liquid from said barrel to any selected brake.

3. In a vehicle having brakes, a cab, conduits extending from each brake to the cab, a brake liquid applicator for the bands of said brakes located in the cab, said applicator comprising a barrel, a piston turnably and reciprocably mounted in the barrel, and a valve turnably mounted in the barrel, said piston provided with means for turning the valve to register with one of said conduits.

4. In a vehicle having brakes, a cab, conduits extending from each brake to the cab, a brake liquid applicator for the bands of said brakes located in the cab, said applicator comprising a barrel, a piston turnably and reciprocably mounted in the barrel, a valve turnably mounted in the barrel to register with any of said conduits, and a telltale for indicating the position of said valve with respect to any brake, whereby liquid may be forced to the band of any selected brake.

5. In a vehicle having brakes, a pump on the vehicle, conduits connecting the pump with each brake, said pump comprising a cylinder, a freely reciprocable piston therein, a plunger for operating the piston, a loose valve in the cylinder adapted to permit communication of the cylinder with the conduits, and means permitting connection of the piston with the loose valve, so that upon manipulation of the plunger the valve may be set with respect to the conduits.

6. In a vehicle having brakes, a pump on the vehicle, conduits connecting the pump with each brake, said pump comprising a cylinder, a rotatable valve in the cylinder, and a piston in the cylinder adapted for both reciprocatory movement for pumping and rotative movement for setting the valve with respect to the conduits, said piston and valve including connecting means for causing the valve to be so set.

7. In a vehicle having brakes, a pump connected by conduits to the brakes for supplying fluid thereto, said pump comprising a cylinder, a freely reciprocating piston therein, a plunger for the piston, a rotatable valve disk in the cylinder, and means whereby the valve disk may be optionally set with respect to any conduit by manipulating the piston for supplying fluid to the selected brake.

In testimony whereof I affix my signature.

FRANK C. LIKAS.